United States Patent [19]

Wolfersberger et al.

[11] Patent Number: 5,409,971
[45] Date of Patent: Apr. 25, 1995

[54] FUNCTIONALIZED MULTISTAGE POLYMERS

[75] Inventors: Martha H. Wolfersberger, Perkasie; Frederick J. Schindler, Fort Washington; Ronald S. Beckley, Gilbertsville; Ronald W. Novak, Ottsville, all of Pa.

[73] Assignee: Rohm and Haas Company, Philadelphia, Pa.

[21] Appl. No.: 191,692

[22] Filed: Feb. 4, 1994

Related U.S. Application Data

[62] Division of Ser. No. 993,161, Dec. 18, 1992, Pat. No. 5,306,744.

[51] Int. Cl.$^6$ .................. C08J 3/05; C08L 33/08; C08L 33/10; C08F 2/46
[52] U.S. Cl. .................. 523/201; 522/86; 522/149; 524/522; 524/523; 525/902
[58] Field of Search .......... 523/201; 522/86, 149; 524/522, 523; 525/902; 430/287

[56] References Cited

U.S. PATENT DOCUMENTS

| | | | |
|---|---|---|---|
| 4,101,493 | 7/1978 | Nakagawa et al. | 524/311 |
| 4,107,013 | 8/1978 | McGinniss et al. | 522/86 |
| 4,244,850 | 1/1981 | Mylonakis | 524/396 |
| 4,315,085 | 2/1982 | Ozari et al. | 525/902 |
| 4,351,875 | 9/1982 | Arkens | 523/201 |
| 4,925,893 | 5/1990 | Padget et al. | 524/337 |

FOREIGN PATENT DOCUMENTS

| | | |
|---|---|---|
| 172589 | 7/1985 | European Pat. Off. |
| 330246 | 1/1989 | European Pat. Off. |
| 331421 | 2/1989 | European Pat. Off. |
| 342042 | 5/1989 | European Pat. Off. |
| 422653 | 2/1991 | European Pat. Off. |
| 0486278 | 11/1991 | European Pat. Off. |
| 270702 | 11/1988 | Japan |

OTHER PUBLICATIONS

Loutz, J. M., et al., "Water-Based Ultraviolet Electron-Beam Reactive Polymers", Organic Coatings 8, pp. 197–208 (1986).

Coating compositions for paper. Sugiyama, Iwao (Seiko Chemical Industry Co., Ltd.) Wood Products, vol. 88, No. 16, Apr. 17, 1988, p. 89, col. 2.

*Primary Examiner*—Peter A. Szekely
*Attorney, Agent, or Firm*—Wendy A. Taylor

[57] ABSTRACT

An aqueous, radiation-curable, functionalized latex polymer composition and its preparation are disclosed. The composition is a multistaged latex polymer formed from a first stage polymer and a second stage polymer having $\alpha, \beta$-unsaturated carbonyl functionalization which permits curing by UV radiation. The composition dries tack-free before curing. The final cured UV coating has excellent solvent resistance, water resistance, stain resistance, direct impact resistance and hot print resistance. The composition is useful in coatings, adhesives, inks and leather coatings, and is particularly useful as a coating on wood. The multistaged latex polymer is made by (a) forming a multistage polymer having
  (1) a first stage polymer; and
  (2) a second stage polymer comprising at least one comonomer containing acid functionality;
(b) partially neutralizing said acid functionality of said second stage polymer of said multistage polymer with a base; and
(c) reacting said multistage polymer having partially neutralized acid functionality with a monoethylenically unsaturated epoxide compound.

14 Claims, No Drawings

FUNCTIONALIZED MULTISTAGE POLYMERS

This is a divisional of application Ser. No. 993,161, filed Dec. 18, 1992, now U.S. Pat. No. 5,306,744.

FIELD OF THE INVENTION

This invention relates to a radiation-curable polymer and coating and, more particularly, to a radiation curable, functionalized multistage latex polymer and a radiation-curable, aqueous coating containing the polymer. This invention is also related to a method of making the functionalized multistage polymers and to a method of using functionalized multistage polymers to reduce monomer levels in radiation-curable, aqueous coatings.

BACKGROUND OF THE INVENTION

There is a need for high performance coatings that can be applied with low levels of polluting solvents and monomers. Aqueous-based thermoplastic coatings can be applied with low levels of polluting solvents, but they do not have the heat and chemical resistance required for many applications, especially where parts must be stacked soon after coating and where the substrate cannot be heated to high temperatures. Chemically-cured coatings that give good heat and chemical resistance have problems with pot life and cure speed.

Multifunctional materials may be blended with aqueous latex polymers to give a UV-curable composition. Problems are encountered with these two component UV-curable compositions:

First, the multifunctional materials, such as for example monomers and oligomers, may present safety, health and environmental problems.

Second, problems are encountered with mixing the multifunctional materials with the latex polymers, including incompatibility of the two components and the burden and inefficiency of additional steps. The multifunctional material may have to be preemulsified before it can be added to the latex polymer. Improper preemulsification leads to defects in the final UV-cured coating.

Incorporating the multifunctionality into the polymer provides a solution to these problems. A number of patents and publications have disclosed aqueous UV-curable compositions formed from functional latex polymer emulsions:

U.S. Pat. No. 4,107,013 teaches a UV-curable aqueous latex paint containing a latex and 5–35% of an emulsified low molecular weight crosslinking agent wherein the latex has a shell of copolymerized difunctional monomers containing unreacted allyl surface groups.

U.S. Pat. No. 4,244,850 teaches an air-curing latex coating composition containing unsaturated resin particles, drier salt emulsion and water-immiscible organic solvent. The unsaturated resin is formed from 1–20% by weight of a monoethylenically unsaturated monomer having a carboxyl or 1,2-epoxy functionality, a portion of which has been reacted with 1,2-epoxy or carboxyl functionality, respectively, to provide unsaturation sites on the resin particles. The resin is not neutralized before functionalization.

European Patent Application EP 330,246 teaches a curable dispersion formed by first polymerizing an organic phosphate or phosphonate compound or mixtures thereof with a (meth)acrylate derivative or an other unsaturated compound or a styrene derivative and then adding an ethylenically unsaturated, epoxy-containing monomer.

U.S. Pat. No. 4,925,893 teaches auto-oxidative and radiation curable vinylidene chloride/vinyl chloride/2-ethylhexyl acrylate latices having residual unsaturation via the addition of a gel fraction of at least 5 weight % formed from a multifunctional monomer early in the polymerization and the addition of a low reactivity multifunctional compound, such as diallyl phthalate, late in the polymerization.

European Patent Application EP 442,653 teaches the preparation of polymers containing functionality. An amine functional latex is formed by reacting a carboxyl functional latex with aziridines. The amine functional latex is then reacted with a material having both an enolic carbonyl group and another functional group, for example 2-(acetoacetoxy)ethyl methacrylate to give a methacrylate functional polymer.

Loutz et al. [*Organic Coatings*, Number 8, pages 197–209 (1986)] teach the preparation of emulsion according to a core-shell introduction of the feed pre-emulsion in a 7/3 ratio. The difunctional monomer is contained in the shell pre-emulsion.

The foregoing exemplifies numerous prior attempts to make crosslinkable, UV-curable coatings from polymer emulsions having functionality. However, none of these references teaches or suggests a multistage latex polymer having $\alpha, \beta$-unsaturated carbonyl functionality in the outer stage or its preparation.

SUMMARY OF THE INVENTION

This invention is directed to a radiation-curable, functionalized latex polymer composition and its preparation. The radiation-curable latex polymer composition is a multistage latex polymer having a first stage polymer and a second stage polymer having $\alpha, \beta$-unsaturated carbonyl functionality, wherein the weight ratio of said first stage polymer to said second stage polymer is from about 20:80 to about 70:30. The $\alpha,\beta$-unsaturated carbonyl functionalization permits curing by UV radiation. An aqueous coating containing the polymer dries tack-free before curing. The final cured coating has solvent resistance, water resistance, stain resistance, direct impact resistance and hot print resistance. The polymer is useful in coatings, adhesives, inks and leather coatings, and is particularly useful as a coating on wood.

This invention is also directed to a method of forming a radiation-curable multistage polymer made by
(a) forming a multistage polymer having
  (1) a first stage polymer; and
  (2) a second stage polymer comprising at least one comonomer containing acid functionality;
(b) partially neutralizing said acid functionality of said second stage polymer of said multistage polymer with a base; and
(c) reacting said multistage polymer having partially neutralized acid functionality with a monoethylenically unsaturated epoxide compound.

DETAILED DESCRIPTION OF THE INVENTION

The polymers of this invention are multistaged latex particles made up of at least two mutually incompatible copolymers. "Latex" as used herein refers to a dispersion of a water-insoluble polymer which may be prepared by conventional polymerization techniques such as, for example, by emulsion polymerization. These mutually incompatible copolymers may be present in the following morphological configurations, for example, core/shell, core/shell particles with shell stages incompletely encapsulating the core, core/shell particles with a multiplicity of cores, interpenetrating network particles, and the like. In all of these cases the majority of the surface area of the particle will be occupied by at least one outer stage and the interior of the particle will be occupied by at least one inner stage.

The mutual incompatibility of two copolymer compositions may be determined in various ways known in the art. For example, scanning electron microscopy using staining techniques to emphasize the difference between the appearance of the phases or stages is one such technique.

The functionalized multistage latex polymer of this invention shall be described as containing a "first stage" and a "second stage." The "second stage" as used herein does not mean to exclude the possibility that one or more polymers can be interposed between or formed on the first stage polymer and before the second stage polymer. In addition, "first stage" and "second stage" are not used to imply in what sequence the polymers are formed.

The functionalized multistage latex polymer of this invention has a weight ratio of first stage polymer to second stage polymer of from about 20:80 to about 70:30 and preferably from about 30:70 to about 50:50.

The first stage polymer may be formed from a mixture of comonomers containing less than about 10% by weight of at least one crosslinking comonomer, preferably at a level of from about 1% by weight of the first stage comonomers to about 5% by weight of the first stage comonomers.

"Crosslinking comonomer" as used herein refers to a polyfunctional monomer or mixture of monomers which crosslinks a polymer composition during the initial formation thereof. Subsequent drying or other curing techniques are not required. Comonomers of this type are well-known and include monomers wherein the functionality is of substantially equivalent reactivity so that uniform crosslinking occurs. Typically, such comonomers contain at least two addition polymerizable vinylidene groups and are $\alpha, \beta$-ethylenically unsaturated monocarboxylic acid esters of polyhydric alcohols containing 2-6 ester groups. Suitable crosslinking comonomers include alkylene glycol diacrylates and dimethacrylates, such as for example, ethylene glycol diacrylate, ethylene glycol dimethacrylate, 1,3-butylene glycol diacrylate, 1,4-butylene glycol diacrylate propylene glycol diacrylate and triethylene glycol dimethacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bisacrylamide, methylene bis-methacrylamide, divinyl benzene, vinyl methacrylate, vinyl crotonate, vinyl acrylate, vinyl acetylene, trivinyl benzene, triallyl cyanurate, divinyl acetylene, divinyl ethane, divinyl sulfide, divinyl ether, divinyl sulfone, diallyl cyanamide, ethylene glycol divinyl ether, diallyl phthalate, divinyl dimethyl silane, glycerol trivinyl ether, divinyl adipate; dicyclopentenyl (meth)acrylates; dicyclopentenyloxy (meth)acrylates; unsaturated esters of glycol monodicyclopentenyl ethers; allyl esters of $\alpha, \beta$-unsaturated mono- and dicarboxylic acids having terminal ethylenic unsaturation including allyl methacrylate, allyl acrylate, diallyl maleate, diallyl fumarate, diallyl itaconate and the like. Allyl methacrylate is preferred.

The balance of the first stage polymer can be formed from a wide variety of monomers or mixture of monomers. These monomers include acrylic acid ester monomers, including methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate, octyl acrylate, isooctyl acrylate, 2-ethylhexyl acrylate, decyl acrylate, isodecyl acrylate, lauryl acrylate, bornyl acrylate, isobornyl acrylate, myristyl acrylate, pentadecyl acrylate, stearyl acrylate and the like; methacrylic acid ester monomers, including methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate and the like; acrylic acid, methacrylic acid, itaconic acid, maleic acid, fumaric acid, styrene, substituted styrenes, butadiene, acrylonitrile, ethylene, vinyl acetate, and the like may be used.

Hydrophobic monomers, such as for example, butyl acrylate and styrene, are preferred monomers for the balance of the first stage polymer to impart water resistance to the final coating.

The second stage polymer of this invention contains $\alpha, \beta$-unsaturated carbonyl functional groups which permit the multistage polymer to undergo curing by irradiation. Suitable monoethylenically unsaturated functional groups include (meth)acrylate, fumarate, maleate, cinnamate and crotonates. (Meth)acrylate functional groups are preferred.

As used herein, acrylate and methacrylate are referred to as "(meth)acrylate", acryloyl group and methacryloyl are referred to as "(meth)acryloyl" and acrylic acid and methacrylic acid are referred to as "(meth)acrylic acid".

The functionalized latex polymer emulsion may have a level of solids from about 25% to about 50%, preferably from about 35% to about 45%.

The $\alpha, \beta$-unsaturated carbonyl functional groups may be incorporated into the second stage polymer by employing a multistage polymer wherein the second stage polymer is formed from about 30% by weight to about 60% by weight, preferably from about 35% by weight to about 45% by weight, of an acid-containing comonomer or mixtures thereof. Useful acid-containing comonomers include those comonomers having carboxylic acid functionality, such as for example acrylic acid, methacrylic acid, iraconic acid, fumaric acid, citraconic acid; phosphoethyl methacrylate and the like.

The acid functionality is at least partially neutralized using a suitable base, such as for example, ammonium hydroxide, sodium hydroxide, potassium hydroxide, sodium carbonate and the like. In addition, a quaternary ammonium phase transfer agent, such as for example tetrabutyl ammonium hydroxide, diallyl dimethyl ammonium hydroxide and the like, may be added. The base is added at a level of from about 10 mole % on acid to about 15 mole % on acid if quaternary ammonium phase transfer agent is present. The base is added at a level of about about 30 mole % on acid if no quaternary ammonium phase transfer agent is present.

The multistage polymer having partially neutralized acid-functionality in the second stage is then reacted with a monoethylenically unsaturated monoepoxide. Suitable monoethylenically unsaturated monoepoxides include glycidyl (meth)acrylate, allyl glycidyl ether, glycidyl cinnamates, glycidyl crotonares, glycidyl itaconates, glycidyl norbornenyl ester, glycidyl norbornenyl ether and the like.

It is preferred that the coating formulation contains less than about 5.0% by weight, more preferably less than about 3.0% by weight, most preferably less than about 0.5% by weight of water soluble materials including inorganic salts and the residual monomer byproducts of the hydrolysis of the monoethylenically unsaturated monoepoxide, such as dihydroxypropyl methacrylate from the hydrolysis of glycidyl methacrylate and glycerol and methacrylic acid from the further hydrolysis of hydroxypropyl methacrylate. Dried coating formulations having less than 5.0% by weight of these byproducts have improved resistance to water. Suitable methods for removing water soluble materials include treatment by ion exchange resins, filtration and the like.

By utilizing the radiation-curable composition of this invention, the need for a separate monomer component in a formulated coating is eliminated. The reduced or eliminated monomer levels improve the safety, health and environmental implications of the uncured and cured coating formulation and eliminate the problems associated with formulating a coating having a separate monomer component, such as for example mixing and dispersion problems. The functionality is incorporated directly into the multistage latex polymer providing a one component system with reduced or eliminated levels of monomers.

The formulated coating may optionally contain an ultraviolet photoinitiator. The low amount of photoinitiator which can optionally be employed is an additional advantage of the present invention. The photoinitiator may be added to the composition from about 0.2% by weight of total nonvolatiles to about 1.0% by weight of total nonvolatiles. Useful photoinitiators include cleavage-type initiators, halogenated polynuclear ketones, such as chlorosulfonated benzanthones, chlorosulfonated fluorenones, α-haloalkylated benzanthrones, and α-haloalkylated fluorenone as disclosed in U.S. Pat. Nos. 3,827,957 and 3,827,959; benzoin, its ethers, such as methyl ether, ethyl ether, isopropyl ether, butyl ether, octyl ether and the like; carbonyl compounds such as diacetyl, benzil and the like; sulfur compounds such as diphenyl sulfide, dithiocarbamate and the like; α-chloromethyl naphthalene and anthracene. Other useful photoinitiators include alkylphenones and benzophenones as disclosed in U.S. Pat. No. 3,759,807. Photoinitiators suitable for pigmented coatings are suggested in U.S. Pat. Nos. 3,915,824 and 3,847,771. Cleavage-type photoinitiators are most preferred.

The formulated coating may contain a thermal initiator if the coating will be cured by heat or a catalyst if the coating will be cured by auto-oxidation. The thermal initiator is added to the composition from about 0.5% by weight of total nonvolatiles to about 2% by weight of total nonvolatiles. Useful thermal initiators include azo compounds, such as azobisisobutyronitrile and the like; organic peroxides, such as ketone peroxides, hydroperoxides, alkyl peroxides, acyl peroxides, peroxy esters and the like; and inorganic peroxides, such as ammonium persulfate, potassium persulfate, hydrogen peroxide and the like. Useful catalysts for auto-oxidative cure include the salts of cobalt, such as cobalt acetate, cobalt naphthenate and the like.

In addition, conventional coating components such as, for example, pigments, dispersants, surfactants, coalescents, wetting agents, rheology modifiers, thickeners, drying retarders, antifoaming agents, colorants, waxes, preservatives, heat stabilizers, ultraviolet light stabilizers and the like may be used in this invention.

Techniques for applying the radiation-curable coating include roller coating, curtain coating, spraying and the like.

The formulated coating may be cured or crosslinked either by applying radiation or by heating after most or all of the water has evaporated from the mixture. Useful radiation includes ionizing radiation, electron beam radiation and ultraviolet radiation. Sources of ultraviolet radiation include sunlight, mercury lamp, carbon-arc lamp, xenon lamp and the like. Medium pressure mercury vapor lamps are preferred.

The formulated coating containing the radiation-curable composition of this invention may be used as topcoats, intermediate coats and primer coats. The coatings are useful in applications which require the reduced odor, toxicity and viscosity of aqueous-based, radiation-curable formulations, such as, for example, paints, including wood lacquers; adhesives; inks, including screen printing inks and gravure and flexographic printing inks; plastics, including vinyl sheeting and polyvinyl chloride flooring; fiber; paper, including overprint varnishes for paper and board; leather; solder mask photoresist on electronic circuit, printing plates and other composites using UV cure. The coatings are particularly useful in applications on wood, such as, for example, cabinets, furniture and flooring.

The following examples are intended to illustrate the invention; they are not intended to limit the invention as other applications of the invention will be obvious to those of ordinary skill in the art. EXAMPLE 1

PREPARATION OF MULTISTAGE POLYMERS

Multistage Polymers 1,3, and 4 are two-stage polymers which were prepared by a conventional gradual-addition, redox initiated, two-stage emulsion polymerization process. The quantity of each ingredient which was added is shown in Table 1.1. Monomer Emulsions I and II were prepared by mixing the appropriate monomers with water and sodium lauryl sulfate (SLS) according to Table 1.1. Water and SLS were charged to the reaction kettle and heated to 60° C. A 0.15% solution of ferrous sulfate heptahydrate ($FeSO_4.7H_2O$) was added. Five minutes later a 4% portion of Monomer Emusion I was added followed by solutions of ammonium persulfate (APS) and sodium bisulfite ($Na_2S_2O_5$) in deionized water. After a 10 minute hold, feed of the remainder of Monomer Emulsion I was begun with the initiator cofeeds. The Monomer Emulsions were added sequentially over 180 minutes and the initiator cofeeds over 200 minutes. Both were stopped for 10 minutes between the first stage and second stage. Following completion of the feed of Monomer Emulsion II, the initiator cofeeds were continued for an additional 20 minutes while continuing to maintain the temperature at 63° C. The kettle was then cooled to 55° C. Aqueous solutions of t-butyl hydroperoxide (tBHP) (70%) and sodium formaldehyde sulfoxylate (SSF) were added sequentially with a 20 minute hold at 55° C. following the addition of each pair. The Mulitstage Polymers were then cooled to room temperature and filtered through 100-mesh and 325-mesh screens.

The compositions of the Multistage Polymers are shown in Table 1.2.

TABLE 1.1

Note: All values are in grams

| | Multistage Polymer | | | |
|---|---|---|---|---|
| | 1 | 2 | 3 | 4 |
| Kettle | | | | |
| Deionized H$_2$O | 635.1 | 635.1 | 635.1 | 635.1 |
| SLS (28%) | 1.1 | 1.1 | 1.1 | 1.1 |
| 0.15% FeSO$_4$.7H$_2$O | 5.3 | 5.3 | 5.3 | 5.3 |
| APS/deionized H$_2$O | 0.23/11.1 | 0.23/11.1 | 0.23/11.1 | 0.23/11.1 |
| Na$_2$S$_2$O$_5$/deionized H$_2$O | 0.05/11.1 | 0.05/11.1 | 0.05/11.1 | 0.05/11.1 |
| Monomer Emulsion I | | | | |
| Deionized H$_2$O | 133.7 | 133.7 | 107.0 | 107.0 |
| SLS (28%) | 23.0 | 23.0 | 18.4 | 16.0 |
| Butyl acrylate | 227.9 | 173.0 | 134.0 | 142.8 |
| Styrene | 148.1 | 203.0 | 157.2 | 167.6 |
| Methacrylic acid | 4.0 | 4.0 | 3.2 | 3.2 |
| Allyl methacrylate | 20.0 | 20.0 | 25.6 | 6.4 |
| Monomer Emulsion II | | | | |
| Deionized H$_2$O | 133.7 | 133.7 | 160.5 | 160.5 |
| SLS (28%) | 23.0 | 23.0 | 27.6 | 24.0 |
| Butyl acrylate | 156.3 | 156.3 | 225.1 | 225.1 |
| Styrene | 43.7 | 43.7 | 62.9 | 62.9 |
| Methacrylic acid | 200.0 | 200.0 | 192.0 | 192.0 |
| n-Dodecyl mercaptan | 1.48 | 1.48 | 2.40 | 2.40 |
| Initiator Cofeeds | | | | |
| APS/deionized H$_2$O | 1.14/84.4 | 1.14/84.4 | 1.14/84.4 | 1.14/84.4 |
| Na$_2$S$_2$O$_5$/deionized H$_2$O | 1.14/84.4 | 1.14/84.4 | 1.14/84.4 | 1.14/84.4 |
| Solutions (2X) | | | | |
| tBHP/deionized H$_2$O | 0.86/2.2 | 0.86/2.2 | 0.86/2.2 | 0.86/2.2 |
| SSF/deionized H$_2$O | 0.40/13.3 | 0.40/13.3 | 0.40/13.3 | 0.40/13.3 |

TABLE 1.2

| Multistage Polymer | First Stage Composition (by weight) | Second Stage Composition (by weight) | Weight Ratio of First Stage to Second Stage |
|---|---|---|---|
| 1 | 57.0BA/37.0Sty/1.0MAA/5.0ALMA | 39.1BA/10.9Sty/50.0MAA//0.37n-DDM | 50:50 |
| 2 | 43.3BA/50.7Sty/1.0MAA/5.0ALMA | 39.1BA/10.9Sty/50.0MAA//0.37n-DDM | 50:50 |
| 3 | 41.6BA/49.1Sty/1.0MAA/8.0ALMA | 46.9BA/13.1Sty/40.0MAA//0.50n-DDM | 40:60 |
| 4 | 44.6BA/52.4Sty/1.0MAA/2.0ALMA | 46.9BA/13.1Sty/40.0MAA//0.50n-DDM | 40:60 |

NOTES:
BA butyl acrylate
Sty styrene
MAA methacrylic acid
ALMA allyl methacrylate
n-DDM n-dodecyl mercaptan

EXAMPLE 2

FUNCTIONALIZATION OF MULTISTAGE POLYMERS

Functionalized Multistage Polymer 1

At 80° C., 24.7 grams (174 milliequivalents or meq) glycidyl methacrylate containing 2000 ppm butylated hydroxytoluene (BHT) were added to a stirred mixture of 200.0 grams Multistage Polymer 1 (232 meq acid) partially neutralized by the addition of 34.8 meq ammonium hydroxide in 134.9 grams deionized water and catalyzed by the addition of 17.4 meq tetrabutyl ammonium hydroxide in 45.0 grams deionized water. The acid titer of the reaction mixture immediately following addition of the glycidyl methacrylate was 0.51 meq/gram. After 4 hours at 80° C., the acid titer had dropped to 0.19 meq/gram, indicating the reaction of the copolymerized acid with 78% by weight of the glycidyl methacrylate. After cooling to room temperature, Functionalized Multistage Polymer 1 was analyzed by gas-liquid chromatography and found to contain 1.3% by weight dihydroxypropyl methacrylate and less than 50 ppm unreacted glycidyl methacrylate. The total solids content of the latex emulsion was 24.6% by weight.

Functionalized Multistage Polymer 2

At 80° C., 60.8 grams (427.5 milliequivalents or meq) glycidyl methacrylate containing 2000 ppm BHT were added to a stirred mixture of 500.0 grams Multistage Polymer 2 partially neutralized by the addition of 85.5 meq ammonium hydroxide in 199.5 grams deionized water and catalyzed by the addition of 42.8 meq tetrabutyl ammonium hydroxide in 100.0 grams deionized water. After 4 hours at 80° C., 79% by weight of the glycidyl methacrylate had reacted with the copolymerized acid. After cooling to room temperature, Functionalized Multistage Polymer 2 was analyzed by gas-liquid chromatography and found to contain 1.6% by weight dihydroxypropyl methacrylate and less than 50 ppm unreacted glycidyl methacrylate. The total solids content of the latex emulsion was 28.9% by weight.

Functionalized Multistage Polymer 3

At 80° C., 22.4 grams (157.5 milliequivalents or meq) glycidyl methacrylate containing 2000 ppm BHT were added to a stirred mixture of 200.0 grams Multistage Polymer 3 partially neutralized by the addition of 6.48 meq ammonium hydroxide in 56.4 grams deionized water and catalyzed by the addition of 15.8 meq tetrabutyl ammonium hydroxide in 56.4 grams deionized water. After 4 hours at 80° C., 80% by weight of the glycidyl methacrylate had reacted with the copolymerized acid. After cooling to room temperature, Functionalized Multistage Polymer 3 was analyzed by gas-liquid chromatography and found to contain 1.6% by weight dihydroxypropyl methacrylate and less than 50 ppm unreacted glycidyl methacrylate. The total solids content of the latex emulsion was 28.8% by weight.

Functionalized Multistage Polymer 4

At 80° C., 23.0 grams (162.0 milliequivalents or meq) glycidyl methacrylate containing 2000 ppm BHT were added to a stirred mixture of 196.6 grams Multistage Polymer 4 partially neutralized by the addition of 43.2 meq ammonium hydroxide in 79.2 grams deionized water and catalyzed by the addition of 16.2 meq tetrabutyl ammonium hydroxide in 33.9 grams deionized water. After 4 hours at 80° C., 72% by weight of the glycidyl methacrylate had reacted with the copolymerized acid. After cooling to room temperature, Functionalized Multistage Polymer 2 was analyzed by gas-liquid chromatography and found to contain 1.5% by weight dihydroxypropyl methacrylate and less than 50 ppm unreacted glycidyl methacrylate. The total solids content of the latex emulsion was 28.7% by weight.

EXAMPLE 3

PREPARATION OF COATING FORMULATIONS

The Coating Formulations were prepared by mixing together the functionalized multistage polymer, photoinitiator (Darocur ® 1173) and deionized water according to Table 3.1. The pH was adjusted to 7.5 using a 15% solution of ammonium hydroxide. The Coating Formulations were allowed to stand overnight before they were applied to the substrates for testing.

TABLE 3.1

| Coating Formulation | Multistage Polymer | Multistage Polymer (grams) | Photo-initiator (grams) | Deionized Water (grams) |
|---|---|---|---|---|
| 1 | 1 | 43.43 | 0.11 | 1.46 |
| 2 | 2 | 38.54 | 0.11 | 6.35 |
| 3 | 3 | 43.31 | 0.13 | 1.56 |
| 4 | 4 | 37.25 | 0.11 | 7.64 |

EXAMPLE 4

PREPARATION OF COMPARATIVE COATING FORMULATIONS

Polymer Latex

The latex polymer emulsion used in the comparative formulation is a conventional nonfunctional acrylic emulsion polymer sold for use in combination with a multifunctional acrylate in UV curable coatings.

Multifunctional Acrylate Pre-emulsification

A 1.2 liter metal bucket with a 12.5 centimeter inside diameter was equipped with a dispersator with a 6.7 centimeter Cowles serrated blade. In the bucket, 12.5 grams surfactant (Triton ® GR-5M) was added to 125.8 grams deionized water. 375 grams trimethylolpropane triacrylate ("TMPTA") was added over a 20 minute period using a 3 milliliter plastic dropper with the dispersator initially at 1000–1200 rpm and increasing the stirring to 2000 rpm as foaming allowed. After the addition of the trimethylolpropane triacrylate, the stirring was increased to 3000 rpm for 10 minutes.

Preparation of Comparative Coating Formulation

In a 2 liter metal bottle with a 5 centimeter stirrer, 0.9 grams photoinitiator (Darocur ® 1173) was added to 844.9 grams latex polymer emulsion. The pre-emulsified multifunctional acrylate (75%) was then added dropwise from a 3 milliliter plastic dropper over a 15 minute period with stirring to just maintain a small surface vortex. After the complete addition of the multifunctional acrylate, the mixture was stirred for an additional 30 minutes. 8.8 grams associative thickener solution (Acrysol ® RM-825—5% solids in water) was added to the mixture adjusting the stirring to keep a small surface vortex. The mixture was stirred for an additional 15 minutes. The mixture was equilibrated for at least 16 hours before use. The viscosity of the formulation was approximately 90 centipoise as measured by a Brookfield viscometer.

EXAMPLE 5

PREPARATION OF COATED SPECIMENS

The coating formulation and comparative formulation were applied to unpolished aluminum or phosphatized steel panels using a wet film applicator suitable for producing a final dried coating thickness of about 1 mil. The coating was allowed to dry for 15 minutes at room temperature and then for 10 minutes at 150° F. in a forced air oven. The coated panel was then cured with one pass through an RPC Model 1202 UV processor equipped with two 200 watts/inch medium pressure mercury arc lamps at a belt speed of 20 feet/minute (approximately 2 Joules/cm$^2$ total energy).

EXAMPLE 6

PERFORMANCE TESTING

The performance properties of coatings formed from functionalized multistage polymers were compared with the performance properties of coatings formed from the comparative formulation.

Solvent Resistince

A cotton-tipped wooden swab saturated with methyl ethyl ketone was rubbed back and forth with force over an approximately 0.75 inch path on each cured coated phosphatized steel panel. A forward and backward rubbing motion was counted as a single "double rub." The number of double rubs required to penetrate each cured coating to the substrate panel was determined. The results are reported in Table 6.1. Higher values indicate better solvent resistance.

Deionized Water Resistance

A 1 square centimenter piece of cheesecloth saturated with deionized water was placed on each cured coated aluminum panel. A 24 mm plastic cap was placed over the cheesecloth and allowed to stand at room temperature for 16 hours. The cap was then removed and the panel was wiped dry with a tissue. The panel was allowed 24 hours to recover. The cured coating was then rated for water resistance on a scale of 0 (no effect) to 5 (cured coating dissolved). The results are reported in Table 6.1.

50% Ethanol Resistance

A 1 square centimenter piece of cheesecloth saturated with 50% ethanol was placed on each cured coated aluminum panel. A 24 mm plastic cap was placed over the cheesecloth and allowed to stand at room temperature for 16 hours. The cap was then removed and the panel was wiped dry with a tissue. The panel was allowed 24 hours to recover. The cured coating was then rated for 50% ethanol resistance on a scale of 0 (no effect) to 5 (cured coating dissolved). The results are reported in Table 6.1.

Shoe Polish Resistance

A 1 square centimenter piece of cheesecloth saturated with shoe polish was placed on each cured coated aluminum panel. A 24 mm plastic cap was placed over the cheesecloth and allowed to stand at room temperature for 16 hours. The cap was then removed and the panel was wiped clean with a tissue. The panel was allowed 24 hours to recover. The cured coating was then rated for shoe polish resistance on a scale of 0 (no staining) to 5 (completely discolored). The results are reported in Table 6.1.

Pencil Hardness

Each steel panel which was coated and cured was tested for pencil hardness using a mechanical holder. Lead of varying hardness was flattened on the end and then pressed against the coating at a 45° angle until either the lead broke or a cut was made through the coating to the substrate. The coating hardness was rated by the hardest lead which did not tear the coating, according to the following chart in order of increasing hardness: 6B, 5B, 4B, 3B, 2B, B, HB, F, H, 2H, 3H, 4H, 5H, 6H, 7H, 8H. The results are reported in Table 6.1. Coatings with a pencil hardness greater than or equal to HB perform satisfactorily.

Mar Resistance

Each steel panel which was coated and cured was tested for mar resistance by striking the coating vigorously several times with the back of a fingernail. The coating was rated on a scale from 0 to 5 with 5=no mark. The results are reported in Table 6.1. Coatings with mar resistance ratings greater than or equal to 4 perform satisfactorily.

Hot Print Resistance

Each steel panel which was coated and cured was tested for hot print resistance. A piece of cheesecloth was placed over the coated side of the steel panel and held at 150° F. for 4 hours at 4 pounds/square inch pressure. The coating was rated on a scale from 0-5 where 0=no print, 1=25% of pattern visible, 2=50% of pattern visible, 3=75% of pattern visible, 4=100% of pattern visible, 5-difficult to remove cloth. The results are reported in Table 6.1. Coatings with print resistance ratings less than or equal to 2 perform satisfactorily.

Direct Impact Resistance

Each steel panel which was coated and cured was tested for direct impact strength with a Gardner falling weight impact tester Model #1G1120. Each cured coated test specimen was placed with the coated side facing up on a die at the base of a guide tube which served as the track for a weighted falling indenter. The weighted indenter was raised to a specific height and released. Each coating was inspected after impact. If the coating did not fracture, the test was again repeated on a new area of the same specimen by releasing the impacter at a higher elevation. If the coating did fracture, a new area was tested at a lower elevation. Each test specimen was rated as the minimum inch-pounds of force required to fracture the coating. The results are reported in Table 6.1. Coatings with direct impact strengths greater than 20 inch-pounds perform well on wood substrates, with direct impact strengths greater than 30 inch-pounds particularly preferred.

TABLE 6.1

| Performance Test | Comparative Formulation 1 | Coating Formulation 1 | Coating Formulation 2 | Coating Formulation 3 | Coating Formulation 4 |
| --- | --- | --- | --- | --- | --- |
| Solvent Resistance (MEK Rubs) | excellent >200 | excellent >200 | good 94 | excellent >200 | excellent >200 |
| Deionized Water Resistance | excellent 0 | excellent 0 | good 2 | good 1-2 | excellent 0 |
| 50% Ethanol Resistance | fair 4 | very good 0.5 | good 1 | very good 0.5 | good 1 |
| Shoe Polish Resistance | very good 0.2 | very good 0.2 | very good 0.2 | good 1 | good 1 |
| Pencil Hardness | 2H | F | F | F | F |
| Mar Resistance | excellent 5 | excellent 5 | good 4 | good 4 | good 4 |
| Hot Print Resistance | very good 0.5 | very good 0.5 | very good 0.5 | very good 0.5 | very good 0.3 |
| Direct Impact Resistance | fair 22-23 | very good 46-47 | good 34-35 | fair 20-21 | fair 18-19 |

The uv-curable coatings (Coating Formulations 1-4) formed from the functionalized multistage polymers of the invention have performance properties approximately comparable to the comparative uv-curable coating (Comparative Coating Formulation 1) but without having a separate monomer component which adds a step to the coating preparation and contributes to safety, health and environmental concerns.

We claim:

1. A radiation-curable, multistaged latex polymer composition, comprising:
   (a) a first stage polymer; and
   (b) a second stage polymer having α, β-unsaturated carbonyl functionality,
   wherein said second stage polymer is formed by the process of
      (i) forming a polymer comprising at least one comonomer containing acid functionality;
      (ii) partially neutralizing said acid functionality of said polymer with a base; and
      (iii) reacting said polymer having partially neutralized acid functionality with a monoethylenically unsaturated epoxide compound; and
   wherein the weight ratio of said first stage polymer to said second stage polymer is from about 20:80 to about 70:30 and wherein said latex polymer composition is radiation curable without the need for the addition of a separate multifunctional material.

2. The radiation-curable, multistaged latex polymer composition of claim 1 wherein the weight ratio of said first stage polymer to said second stage polymer is from about 30:70 to about 50:50.

3. The radiation-curable, multistaged latex polymer composition of claim 1 wherein said second stage polymer contains (meth)acrylate functionality.

4. The radiation-curable, multistaged latex polymer composition of claim 1 wherein said first stage polymer is formed from less than about 10% by weight of the first stage polymer of at least one crosslinking comonomer.

5. The radiation-curable, multistaged latex polymer composition of claim 4 wherein said first stage polymer is formed from about 1% to about 5% by weight of at least one crosslinking comonomer.

6. The radiation-curable, multistaged latex polymer composition of claim 4 wherein said crosslinking comonomer is allyl methacrylate.

7. A coating composition, comprising:
   (a) water; and
   (b) a radiation-curable, multistaged latex polymer comprising:
   (1) a first stage polymer; and
   (2) a second stage polymer having α, β-unsaturated carbonyl functionality,
   wherein said second stage polymer is formed by the process of
      (i) forming a polymer comprising at least one comonomer containing acid functionality;
      (ii) partially neutralizing said acid functionality of said polymer with a base; and
      (iii) reacting said polymer having partially neutralized acid functionality with a monoethylenically unsaturated epoxide compound; and wherein the weight ratio of said first stage polymer to said second stage polymer is from about 20:80 to about 70:30 and wherein said latex polymer composition is radiation curable without the need for the addition of a separate multifunctional material.

8. The coating composition of claim 7 further comprising an initiator.

9. The coating composition of claim 7 wherein the weight ratio of said first stage polymer to said second stage polymer is from about 30:70 to about 50:50.

10. The coating composition of claim 7 wherein said second stage polymer contains (meth)acrylate functionality.

11. The coating composition of claim 7 wherein said first stage polymer is formed from less than about 10% by weight of the first stage polymer of at least one crosslinking comonomer.

12. The coating composition of claim 11 wherein said first stage polymer is formed from about 1% to about 5% by weight of at least one crosslinking comonomer.

13. The coating composition of claim 9 wherein said crosslinking comonomer is allyl methacrylate.

14. A coating formed from the coating composition of claim 7.

* * * * *